(12) United States Patent
Glasser et al.

(10) Patent No.: US 7,653,191 B1
(45) Date of Patent: Jan. 26, 2010

(54) VOICE CALL ROUTING BY DYNAMIC PERSONAL PROFILE

(75) Inventors: Daniel S. Glasser, Mercer Island, WA (US); Jithendra K. Veeramachaneni, Sammamish, WA (US); Alexey Kalinichenko, Bellevue, WA (US); John S. Strauch, Seattle, WA (US); Sharad Mathur, Redmond, WA (US); Keiji Kanazawa, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 900 days.

(21) Appl. No.: 10/607,476

(22) Filed: Jun. 26, 2003

(51) Int. Cl.
*H04M 3/42* (2006.01)
*G06F 15/173* (2006.01)

(52) U.S. Cl. ............... 379/201.1; 379/207.03; 379/211.01; 379/211.02; 379/212.01; 709/224

(58) Field of Classification Search ............ 379/211.01, 379/211.02, 221.02, 207.03, 201.1, 207.1, 379/212.01; 709/224, 202, 230; 370/352
See application file for complete search history.

(56) References Cited

U.S. PATENT DOCUMENTS

| | | | |
|---|---|---|---|
| 6,260,148 B1 | 7/2001 | Aggarwal et al. | |
| 6,366,661 B1* | 4/2002 | Devillier et al. | 379/211.01 |
| 6,415,318 B1 | 7/2002 | Aggarwal et al. | |
| 6,463,145 B1 | 10/2002 | O'Neal et al. | |
| 6,477,240 B1 | 11/2002 | Lim et al. | |
| 6,519,639 B1 | 2/2003 | Glasser et al. | |
| 6,850,968 B1 | 2/2005 | Pfeffer et al. | |
| 7,027,432 B2 | 4/2006 | Carolan et al. | |
| 7,103,167 B2* | 9/2006 | Brahm et al. | 379/211.02 |
| 7,218,722 B1* | 5/2007 | Turner et al. | 379/221.02 |
| 2001/0028660 A1 | 10/2001 | Carolan et al. | |
| 2002/0120760 A1* | 8/2002 | Kimchi et al. | 709/230 |
| 2003/0215078 A1* | 11/2003 | Brahm et al. | 379/211.02 |

(Continued)

FOREIGN PATENT DOCUMENTS

JP 2000115373 A 4/2000

(Continued)

OTHER PUBLICATIONS

Varshney et al., "Voice Over IP," Communications of the ACM, Jan. 2002, pp. 89-96, vol. 45, Issue 1, ACM Press, New York, U.S.A.

(Continued)

*Primary Examiner*—Thjuan K Addy
(74) *Attorney, Agent, or Firm*—Merchant & Gould, P.C.

(57) ABSTRACT

Dynamic telephone call routing. A voice service initiates a voice call session on a data communication network in response to an incoming telephone call directed to a user and generates a notification of the telephone call. An alerts service receiving and responsive to the notification executes a set of routing rules to select a computing device associated with the user. The alerts service also generates an alert directed to the computing device. If the computing device is online, a messaging service sends the alert to the computing device and receives a user request from the computing device in response thereto. The messaging service communicates the user request to the voice service for completing the voice call session to the computing device if specified by the user request. If the computing device is not online, the telephone call is routed to a telephone device.

45 Claims, 8 Drawing Sheets

U.S. PATENT DOCUMENTS

| | | | |
|---|---|---|---|
| 2003/0217098 A1* | 11/2003 | Bobde et al. | 709/202 |
| 2003/0217099 A1* | 11/2003 | Bobde et al. | 709/202 |
| 2003/0217142 A1* | 11/2003 | Bobde et al. | 709/224 |
| 2005/0197155 A1 | 9/2005 | Baker et al. | |
| 2006/0098619 A1 | 5/2006 | Nix et al. | |
| 2006/0190525 A1* | 8/2006 | Bobde et al. | 709/202 |
| 2006/0190591 A1* | 8/2006 | Bobde et al. | 709/224 |

FOREIGN PATENT DOCUMENTS

| | | |
|---|---|---|
| JP | 2001500712 A | 7/2007 |
| WO | WO 01/63862 A1 | 8/2001 |

OTHER PUBLICATIONS

Thai et al., "Integrated Personal Mobility Architecture: A Complete Personal Mobility Solution," Mobile Networks and Applications, Feb. 2003, pp. 27-36, vol. 8, Issue 1, ACM Press, New York, U.S.A.

Maniatis et al., "The Mobile People Architecture," ACM SIGMOBILE Mobile Computing and Communications Review, Jul. 1999, pp. 36-42, vol. 3, Issue 3, ACM Press, New York, U.S.A.

Schmandt et al., "Mediated Voice Communication Via Mobile IP," Proceedings of the 15th Annual ACM Symposium on User Interface Software and Technology, 2002, pp. 141-150, ACM Press, New York, U.S.A.

Perkins, "Mobile Networking in the Internet," Mobile Networks and Applications, 1999, pp. 319-334, vol. 3, Issue 4, ACM Press, New York, U.S.A.

* cited by examiner

TAKE CALL ON THE PC

REDIRECT CALL TO ANOTHER NUMBER

FIG. 9

| MY CALL FORWARDING SETTINGS | |
|---|---|
| CALL FORWARDING | |

○ ROUTE ALL MY CALLS TO:  [HOME PHONE ▽]

⦿ ROUTE ALL MY CALLS BASED ON MY LOCATION

WHEN I'M AT        SEND MY CALLS TO

HOME:    [HOME PHONE ▽]

WORK:    NO WORK HOURS HAVE BEEN SET UP. TO ENTER YOUR WORK HOURS, <u>CLICK HERE.</u>

OTHERWISE:    [HOME PHONE ▽]

OTHER SETTINGS

MY DEFAULT PHONE:    [HOME PHONE ▽]

☐ IF I AM ONLINE, ALWAYS SEND CALLS TO MY DESKTOP FIRST
☑ BLOCK ANONYMOUS CALLS    [UPDATE]

FIG. 10

SCHEDULE

SET UP YOUR SCHEDULE

SELECT TIME ZONE: (GMT-08:00) PACIFIC TIME (US & CANADA); TIJUANA ▽

SEND MY CALLS BASED ON THE FOLLOWING RULES

I AM AT [HOME ▽] FROM [6:00PM ▽] UNTILL [10:00PM ▽]

ON THESE DAYS:
☑ SUN  ☑ MON  ☑ TUE  ☑ WED  ☑ THU  ☑ FRI  ☐ SAT

[ADD RULE]  [CANCEL]

RULES SUMMARY

☑ WORK: FROM 8:00AM UNTILL 5:00 PM MONDAY THRU FRIDAY    ✏ EDIT    ✗ DELETE
☑ HOME: 8:00PM UNTIL 11:00 PM MONDAY THRU FRIDAY    ✏ EDIT    ✗ DELETE
☑ OTHER: 12:00PM UNTIL 1:00 PM MONDAY THRU FRIDAY    ✏ EDIT    ✗ DELETE
☑ OTHER: 5:00PM UNTIL 6:00 PM MONDAY THRU FRIDAY    ✏ EDIT    ✗ DELETE
☑ OTHER: 3:00PM UNTIL 4:00 PM WEDNESDAY AND THURSDAY    ✏ EDIT    ✗ DELETE

|     | 6A | 7 | 8 | 9 | 10 | 11 | 12P | 1 | 2 | 3 | 4 | 5 | 6 | 7 | 8 | 9 | 10 | 11 | 12A | 1 | 2 | 3 | 4 | 5 |
|-----|----|----|----|----|----|----|----|----|----|----|----|----|----|----|----|----|----|----|----|----|----|----|----|----|
| SUN |    |    |    |    |    |    |    |    |    |    |    |    |    |    |    |    |    |    |    |    |    |    |    |    |
| MON |    |    |    |    |    |    |    |    |    |    |    |    |    |    |    |    |    |    |    |    |    |    |    |    |
| TUE |    |    |    |    |    |    |    |    |    |    |    |    |    |    |    |    |    |    |    |    |    |    |    |    |
| WED |    |    |    |    |    |    |    |    |    |    |    |    |    |    |    |    |    |    |    |    |    |    |    |    |
| THU |    |    |    |    |    |    |    |    |    |    |    |    |    |    |    |    |    |    |    |    |    |    |    |    |
| FRI |    |    |    |    |    |    |    |    |    |    |    |    |    |    |    |    |    |    |    |    |    |    |    |    |
| SAT |    |    |    |    |    |    |    |    |    |    |    |    |    |    |    |    |    |    |    |    |    |    |    |    |

WORK ▨    HOME ▩

- MANAGE MY VOICE ACCOUNTS
- EDIT MY PHONE NUMBERS
- EDIT MY SCHEDULE
- SET MY CALL FORWARDING LIST

VOICE CALL ROUTING BY DYNAMIC PERSONAL PROFILE

TECHNICAL FIELD

Embodiments of the present invention relate to the field of telephone communication services available via a data communications network. In particular, embodiments of this invention relates to improvements in dynamically routing an inbound telephone call via the data communications network based on a user's personal profile.

BACKGROUND OF THE INVENTION

In the past, data-centric and telephony-centric communications networks have existed as separate domains. More recently, however, computer users are taking advantage of PC-to-phone technology. Many online service providers seek to offer users with the ability to place telephone calls from their computer devices, using the computer devices as the equivalent of telephone handsets. A frequently used protocol for providing advanced telephony services across the Internet is referred to as Session Initiation Protocol (SIP). SIP, which is currently a proposed standard of the Internet Engineering Task Force (IETF) (see RFC 2543), is a text-based protocol for initiating interactive communication sessions between users. SIP can be used to establish, change and terminate calls between one or more users in a network based on the Internet Protocol (IP).

Moreover, society is becoming increasingly mobile and telephone users strongly desire the ability to place and receive calls from myriad locations. In other words, the ability for a telephone call to "follow" the user, whether logged in from work, home, or a mobile location, is needed.

Conventional telephone and voice systems enable a telephone customer to automatically direct incoming calls to different phones based on a fixed time schedule. Other known systems merely notify an online user of an incoming call on the telephone line being used for the online session. In this context, "online user" refers to a user of a computer presently connected to a network such as the Internet via dial-up access. Unfortunately, users of these conventional systems cannot easily and route their incoming calls dynamically. The need exists to route a user's incoming phone call to wherever the user is currently online but also based on user preferences.

In light of the foregoing, further improvements are needed for intelligent routing of real-time communications using user context such as schedule and presence.

SUMMARY OF THE INVENTION

Embodiments of the invention overcome one or more deficiencies in the known art by providing, among other things, improved call routing. In an embodiment, the invention permits routing an incoming telephone call to wherever a user is currently online (i.e., available via a device connected to a data-centric communications network). This embodiment provides a key aspect of "following" the user, whether the user is logged in to the network from work, home, or a mobile location. If the user is not online, or is not in front of the computer, the invention can forward the call to a telephone based on the user's time of day preferences. At least one embodiment of the invention provides intelligent, dynamic routing of real-time communications using user context such as schedule and presence. Moreover, the features of the present invention described herein are less laborious and easier to implement than currently available techniques as well as being economically feasible and commercially practical.

Briefly described, a method embodying aspects of the invention dynamically routes a telephone call to a user. The method includes initiating a voice call session on a data communication network in response to an incoming telephone call directed to the user. The method also includes executing a set of routing rules, based on user preferences, for routing the telephone call and determining whether a selected computing device associated with the user and coupled to the data communication network is online. The selected computing device is selected according to the routing rules. The method further includes completing the voice call session to the selected computing device, if the selected computing device is online, in response to a user request for receiving the telephone call via the data communication network. If the selected computing device is not online, the method routes the telephone call to a selected telephone device associated with the user and coupled to a telephone network.

In another embodiment, a system dynamically routes a telephone call to a user. The system includes a voice service initiating a voice call session on a data communication network in response to an incoming telephone call directed to the user. The telephone call originates from a public switched telephone network external to the data communication network. Further, the voice service generates a notification of the telephone call. An alerts service receiving and responsive to the notification generated by the voice service executes a set of routing rules to select a computing device associated with the user based on user preferences. The alerts service also generates an alert directed to the selected computing device, which is coupled to the data communication network. A messaging service sends the alert to the selected computing device and receives a user request from the selected computing device in response thereto. The messaging service communicates the user request to the voice service for completing the voice call session to the selected computing device if the user request specifies receiving the telephone call via the data communication network.

In yet another form, a method of dynamically routing a telephone call to a user includes initiating a voice call session on a data communication network in response to an incoming telephone call directed to the user. The method also includes generating a notification of the telephone call and sending the notification to a selected computing device associated with the user and coupled to the data communication network. The notification is sent via the data communication network. The method also includes receiving a user request via the data communication network for routing the telephone call in response to the notification and, responsive to the user request, either completing the voice call session to the selected computing device via the data communication network or routing the telephone call to a selected telephone device via a telephone network.

One or more computer-readable media embodying aspects of the invention have computer-executable components for routing a telephone call dynamically to a user. The computer-readable media include a voice service, an alert service, and a routing service. In this embodiment, the voice service initiates a voice call session on a data communication network in response to an incoming telephone call directed to the user and generates a notification of the telephone call. The alert service sends the notification to a selected computing device associated with the user and coupled to the data communication network. The routing service receives a user request via the data communication network and routes the telephone call in response to the user request. The routing service in this embodiment either completes the voice call session to the selected computing device via the data communication network or routes the telephone call to a selected telephone device via a telephone network.

Computer-readable media having computer-executable instructions for performing methods of dynamic call routing embody further aspects of the invention.

Alternatively, the invention may comprise various other methods and apparatuses.

Other features will be in part apparent and in part pointed out hereinafter.

BRIEF DESCRIPTION OF THE DRAWINGS

FIG. 9 illustrates another exemplary user interface for specifying call forwarding settings according to one embodiment of the invention.

FIG. 10 illustrates an exemplary user interface for specifying user preferences to set call routing rules according to one embodiment of the invention.

Corresponding reference characters indicate corresponding parts throughout the drawings.

DETAILED DESCRIPTION OF THE INVENTION

Figure 1:
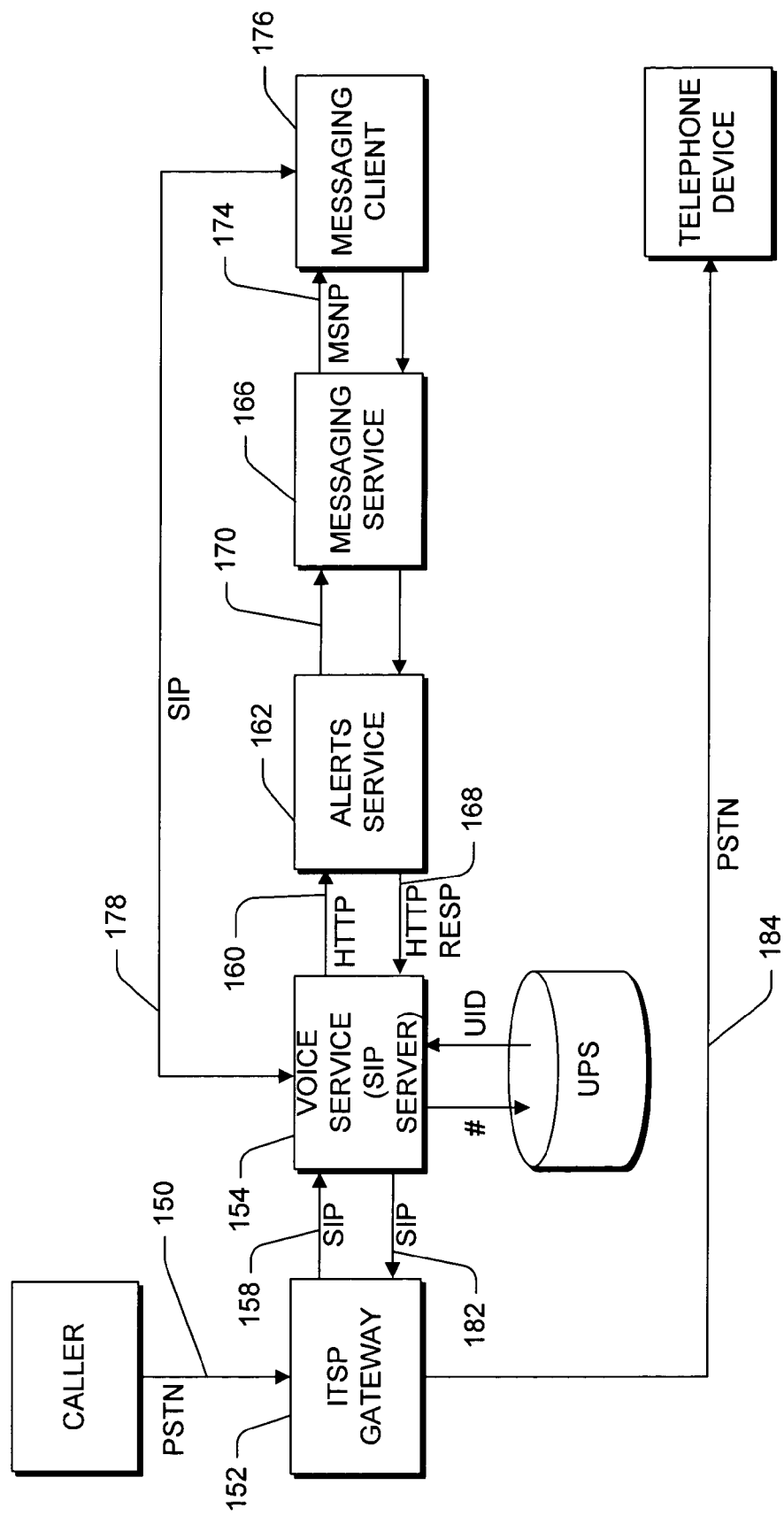
FIG. 1 is a block diagram illustrating a network environment in which the present invention is utilized according to one embodiment of the invention.

Referring now to the drawings, FIG. 1 illustrates an exemplary network environment in which the present invention may be utilized to enable the routing of incoming telephone calls to different destinations based on time of day and a user's online presence status. As an example, a user's online presence status may be determined as a function of his or her availability via a device connected to a data-centric communications network. In this example, the invention provides "follow me" capability for the user. In other words, the system shown in FIG. 1 is configured to direct a phone call to the user's computer desktop or a desired telephone (or compatible device) based on the user's preferences and current context. By introducing the ability to first route a telephone call wherever the user is currently online, the invention provides a key ability to "follow" the user, whether he or she is logged in from work, home, or a mobile location. If the user is not online, or is otherwise unable to access the computer, the invention in this example forwards the call to a phone of the user's preference based on the time of day or another rule. The rules for routing calls may be essentially based on binary presence (i.e., online or offline) or based on various sub-states of presence (e.g., online and active, busy, away, or offline). Intelligent routing of real-time communications based on user context such as schedule and presence is a key value-added service that can impact how people use a phone service.

FIG. 1 illustrates voice call routing by dynamic personal profile according to one embodiment of the present invention. A series of actions occur when a caller dials an inbound calling number associated with the user. First at 150, a conventional Public Switched Telephone Network (PSTN) routes the inbound or incoming call to an Internet Telephony Service Provider (ITSP) gateway 152 known to those skilled in the art. The ITSP 152 contacts a voice service 154 embodied by one or more Session Initiation Protocol (SIP) servers. This contact is illustrated at 158 in FIG. 1. In other words, the user's inbound ITSP presents the call to the SIP proxy server as a SIP INVITE message.

Those skilled in the art are familiar with Internet voice services. In general, an ITSP is responsible for managing and provisioning its own numbers. When the user signs up for the service, a provisioning process assigns one or more telephone numbers to the user. A call placed in the PSTN to the user's inbound calling service number traverses the telephone network and eventually reaches the ITSP. The ITSP uses the incoming call information to construct a SIP INVITE message sent to the voice services inbound SIP proxy. This message identifies the called party using a Uniform Resource Identifier (URI) in the "To:" field of the SIP INVITE message header, which includes the called number. When the calling party information is available, it is formatted as a URI in the "From:" field.

The voice service 154 receives the INVITE and extracts the called number. As shown in FIG. 1, voice service 154 consults a user profile store (UPS) to determine a unique identifier (UID) associated with the telephone number. If the UID lookup is successful, voice service 154 returns, for example, the SIP response "180 Ringing" to ITSP 152 to cue the ITSP to begin playing a ring tone or "Please Wait" message to the caller.

According to one embodiment of the invention, the voice service 154 initiates a SIP voice call session based on information pertaining to the incoming call received from ITSP 152. Voice service 154 synchronously sends, at 160, an incoming call notification to an alert service 162. In the illustrated embodiment of FIG. 1, voice service 154 provides the notification in the form of a Hypertext Transfer Protocol (HTTP) request. At this point, the incoming call is "parked" in a waiting state, to be completed or aborted, i.e., terminated, based on caller or user actions. A typical waiting time is about one second before a parked call is aborted due to expiration of a preset waiting state.

The alert service 162 is an information delivery service designed to notify the user of certain time-sensitive events and information. In one embodiment, the alerts take the form of a "pop-up" notification. For example, the Microsoft® .NET Alerts service is suitable for use in connection with the present invention. Among other things, the Microsoft® .NET Alerts service executes a rules engine permitting a subscriber to specify call routing preferences. In one embodiment, the voice features are implemented as extensions to the existing alert service backend, user interface, and platform.

Upon receipt of the notification, the alert service 162 shown in FIG. 1 looks up the inbound calling user's rules for routing the telephone call. The rules determine to which telephone to forward the call based on, for example, the time of day and other information. In other words, the alert service 162 executes routing rules to decide what to do with the call on the basis of the user's preferences and current context. If the user has chosen to forward calls to his or her desktop personal computer, then alert service 162 takes advantage of an existing instant messaging service 166 (e.g., MSN® Messenger) for providing the notification to the user.

As described above, the alert service 166 of FIG. 1 implements a rules engine that processes the call notification from voice service 154. The rules engine is responsible for alerting the user of the incoming call. In the event the user is not logged into the messaging service 166 (or in another state such as "busy" or "away" in which calls should not be delivered), alert service 162 processes user-defined rules in server-side code. Voice service 154 (i.e., the SIP server) sends incoming call information such as the called number and associated UID to the rules engine. When available, the calling number and name information is included as well. Alert service 162 responds immediately with a synchronous reply. Advantageously, the present invention permits the rule format and interfaces to be easily changed because alert service 162 executes server-side code.

The user can opt to take the call at his or her computer (see messaging client 176) if appropriately equipped or can redirect the call using one of several call control options. In general, the rules engine executed by alert service 162 examines a set of rules, an address book, user's presence, and time for determining call routing preferences. TABLE I summarizes the contexts used by the rules engine of alert service 162 (i.e., the rules engine) for deciding what actions are taken in response to a call notification:

TABLE I

| Context | Description |
| --- | --- |
| Caller ID bits | Caller ID bits can be "normal", "unavailable", and "anonymous/blocked" |
| Time of day/day of week | The current time and day |
| Online presence | The user is online with the messaging service |

At 168, alert service 162 responds to the HTTP request from voice service 154. The HTTP response from alert service 162 can include a forwarding telephone and can indicate whether or not the call was actually sent to the messaging service 166 (e.g., whether the user was online and active versus whether the user was either offline or online and idle). As an example, the time between when alert service 162 receives an inbound, or incoming, call notification and when it returns the synchronous response with the call result is on the order of 0.1 seconds or less. Voice service 152 times out requests to alert service 162 when they take longer than a predetermined length of time (e.g., 0.5 or 1.0 second). At this point, alert service 162 has essentially completed its work for this call.

In one embodiment, alert service 162 supports the capabilities shown in TABLE II, which correspond to user preferences included in, for example, the HTTP response at 168:

TABLE II

| Feature | Description |
| --- | --- |
| Route by presence | Forward call to the computer desktop first if user is online with a messaging service. |
| Route by calendar | Forward call to different phones based on time of day/day of week, which can be categorized as "Work" time and "Home" time. |

TABLE II-continued

| Feature | Description |
| --- | --- |
| Block anonymous callers | For calls that have anonymous caller ID bit set, block the call. |

Figure 4:
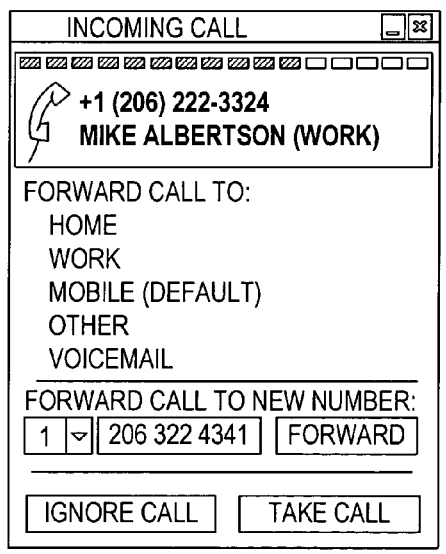
FIG. 4 illustrates an exemplary user interface for an incoming call control dialog according to one embodiment of the invention

In the embodiment of FIG. 1, the SIP server of voice service 154 sends the telephone call to messaging service 166 at 170 like any other alert bound for the messaging service. Messaging service 166 sends the call alert at 174 to a suitably configured messaging client 176 (e.g., the user's desktop computer). An incoming call pop-up notification appears at the messaging client 176 in response to the incoming call alert (see FIG. 3A to FIG. 3D). When voice service 154 sends the incoming call notification to alert service 162, it formats the body specifically so that messaging service 166 knows to pop up the special notification user interface component. If the user clicks on the notification, messaging service 166 will pop up a suitable user interface such as an incoming call control dialog (e.g., via an applet executed by messaging client 176). FIG. 4 illustrates an exemplary incoming call control dialog according to the invention.

FIG. 1 generally illustrates the call being sent to messaging service 166. As described above, the messaging client 176 pops up an incoming call notification when it receives an incoming call alert. The incoming call control dialog of FIG. 4, for example, gives the user a choice of taking the call on his or her computer or forwarding the call to another phone. Depending on the user's selection, messaging service 166 will connect with voice service 154 and indicate the user's choice. If the user did not click on the incoming call pop-up notification in response to the alert at 170, then messaging service 166 will also connect with voice service 154 and indicate that a default action should be taken.

At this point, the incoming call is "parked" at voice service 154 and can be routed according to the user's request. The response received by voice service 154 from alert service 162 contains information such as whether the incoming call notification was sent to messaging client 176 (based on, for example, the online status of messaging client 176). If the incoming call notification was not sent to messaging client 176, then voice service 154 immediately directs ITSP 152 to route the incoming call to the forwarding number returned in the HTTP response from alert service 162. On the other hand, if alert service 162 indicates that the incoming call notification was sent to the desktop, voice service 154 waits for an incoming SIP connection from desktop messaging as shown at 138. FIG. 1 indicates the SIP response to ITSP 152 at 182.

In the embodiment of FIG. 1, if voice service 154 receives a connection from the desktop, then: a) if the user chooses to take the call on the desktop, the SIP server of voice service 154 initiates a real-time IP phone session between the desktop (i.e., messaging client 176) and ITSP 152 using, for example, RTP/RTCP (Real Time Protocol/Real-Time Control Protocol); b) if the user chooses to forward the call to another telephone, the SIP server of voice service 154 directs ITSP 152 to route the incoming call to the phone number selected by the user; and c) if the user did not respond, then the SIP server of voice service 154 directs ITSP 152 to route the incoming call to the forwarding number returned by alert service 162 in its HTTP response at 168. Further to this example, if the SIP server of voice service 154 fails to receive a connection from the desktop, then it also directs ITSP 152 to route the incoming call to the forwarding number returned by alert service 162.

In contrast to the foregoing, if the alert service 162 of FIG. 1 does not respond within a predetermined interval of time while voice service 154 has the incoming call parked, voice service 154 directs ITSP 152 to route the call to a default phone number that it reads from a predefined user profile (e.g., based on information returned by alert service 162 previously).

FIG. 1 indicates at 184 that ITSP 152 directs the incoming call to the specified phone number if voice service 154 responds with a redirect.

In one embodiment, voice service 154 sends a cancellation notification to alert service 162 to cancel the incoming call if the original caller hangs up while the call is parked at the SIP server. At this point, alert service 162 forwards the cancellation notification to messaging service 166, which will cancel the incoming call as necessary.

It is to be appreciated that the voice service 154, alert service 162, and messaging service 166, in addition to messaging client 176, are coupled to a data-centric, data communication network. Because voice communications over a data communications network use a real-time communication channel, alert service 162 attempts to minimize the amount of time it takes to process the inbound routing decision making. Specifically, as described above in connection with FIG. 1, the time between communications at 160 and 168 is desired to be much less than one second.

Figure 2:
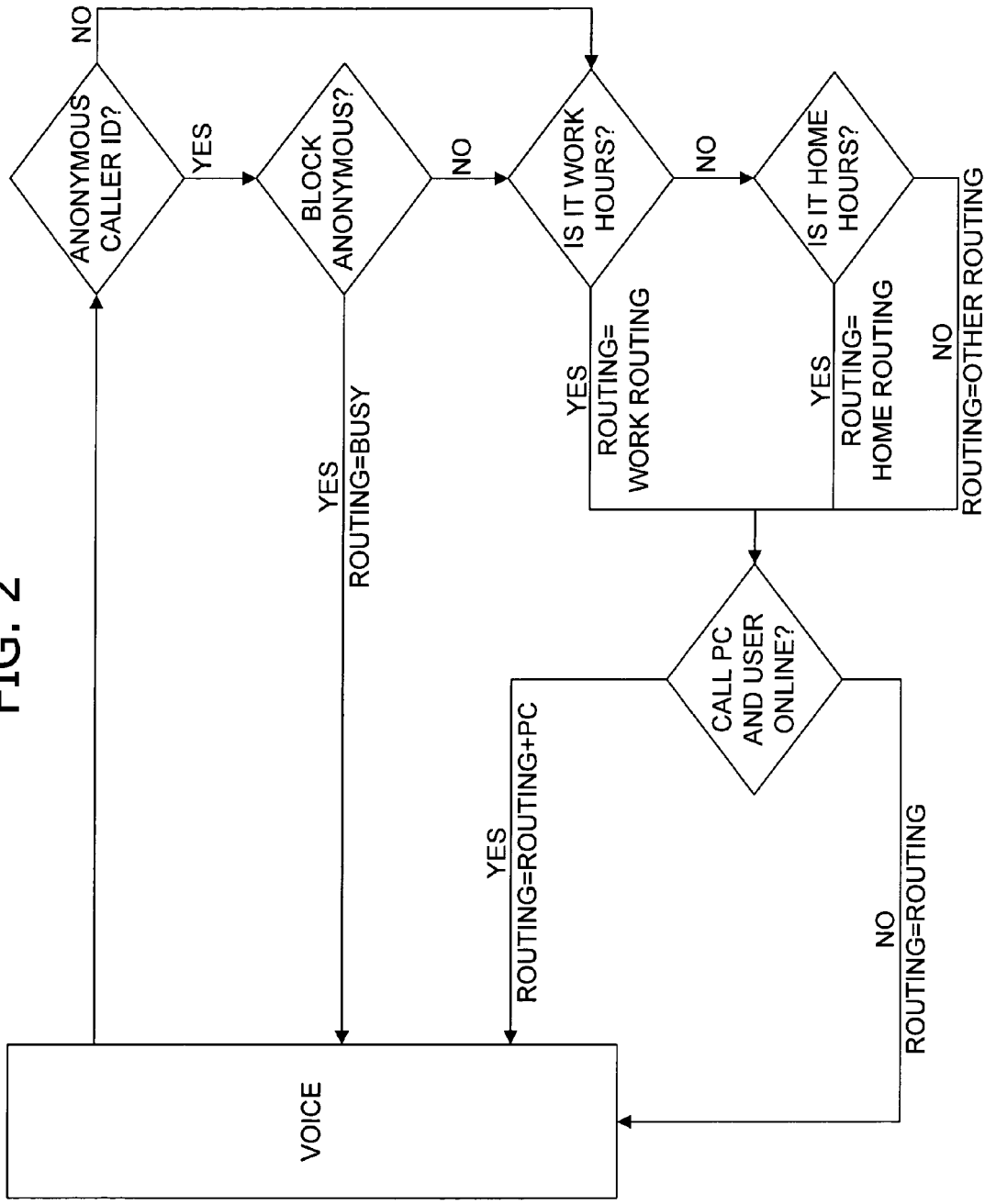
FIG. 2 is an exemplary flow diagram illustrating operation a rules engine executed by an alert service of FIG. 1.
Figure 3A:
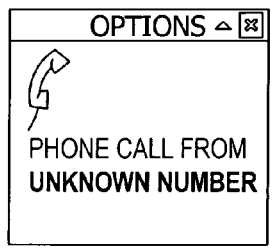
FIG. 3A to FIG. 3D illustrate exemplary user interfaces providing popup notifications from the alert service of FIG. 1.
Figure 3B:
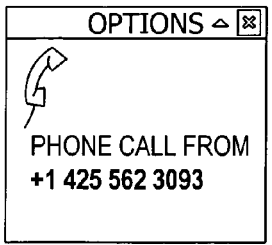
Figure 3C:
Figure 3D:
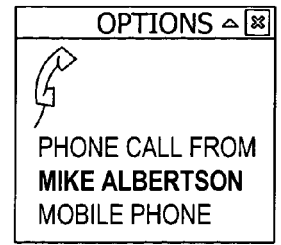

FIG. 2 illustrates core functionality of the rules engine for incoming voice calls executed by alert service 162. The functionality falls in two main areas: a) decision making for where to route the incoming call; and b) session invite for a PC phone call. As described above, voice server 154 sends an incoming call notification for the subscriber to alert service 162 when a call comes in. The rules engine capability then decides what to do with the call on the basis of the subscriber's preferences and the current context. The rules engine supports the following capabilities, which correspond to user preferences shown above in TABLE II. The contexts used by the rules engine for deciding what to do are shown above in TABLE I.

Based on the user preferences and contexts above, the decision of the rules engine can be captured in the exemplary flow diagram of FIG. 2. In the flow diagram, "Routing" is the result that is returned to voice service 154. "Routing=Work Routing" indicates that the target phone should be the phone that the user has set to be the forwarding phone for the Work time period. For blocking calls from anonymous callers, "Routing=Busy."

FIG. 3A to FIG. 3D illustrate several examples of the popup notification, or pop-up notification, from alert service 162 and provided at messaging client 176 via messaging service 166. For example, the caller's name and/or number may be unavailable. If the calling number is available and but not recognized (e.g., not present in the user's address book), the alert will merely display the number. The alert is also capable of displaying caller ID information as well as additional information if the number corresponds to an entry in the user's address book.

FIG. 4 is an exemplary user interface (UI) notifying the user of the incoming call. In one embodiment of the invention, messaging service 166 executes an applet on messaging client 176 for generating and displaying the notification.

The incoming call control dialog of FIG. 4 presents the information that is known about the call and a variety of call handling options from which the user may choose. For example, there are several entries in the "Forward call to:" section, such as: Home; Work; Mobile; Other; and Voicemail. Further to example, the UI only shows numbers that the user has populated for Home, Work, Mobile, and Other. In one embodiment, the UI provides the Voicemail entry if the user has voicemail with his or her provider. The number to which the call will be forwarded if the user does not respond is indicated by "(default)" in, for example, red text near the entry's text. If the user clicks the [x] to close the dialog of FIG. 4, the invention in this embodiment returns a response to indicate that the call will be disregarded. It is to be understood that a suitable UI may also be provided having a form field for the user to specify a desired number for call forwarding.

In FIG. 4, the dialog only provides the user with a limited amount of time to select one of the available actions. A UI element may be used to inform the user of the amount of time remaining to make a selection. For example, a "time-to-live" strip across the top of the dialog window, which changes color or moves over the life of the dialog, is contemplated. In one embodiment, such a time-to-live strip to live changes from, for example, fully green to fully gray as the interval of time for making a selection expires. If the user does not act within this interval of time, the invention can select the default action unless the caller hung up. When the time expires, the window disappears.

If the routing rules indicate that the user should be notified of the call, alert service 162 attempts to deliver an alert to the user. This alert includes the list of phone number types associated with the user. If applicable, voicemail routing information is included along with called number, and whatever calling party information is available. The alert also includes a default number where the call should be forwarded if there is no response by the user.

If the user is not online, or the rules determine not to notify the user, alert service 162 sends an asynchronous response to the SIP proxy with reroute instructions that resulted from the rules processing. On the other hand, if the user is online, alert service 162 delivers the alert via messaging service 166 and displays an appropriate pop-up notification to announce the incoming call and present any information known about the caller.

In one embodiment, the invention permits the user to easily avoid undesirable calls. As shown in FIG. 4, the incoming call control dialog provides an Ignore Call button. Using the Ignore Call button results in a SIP message instructing ITSP 152 to play a message for the caller such as "The person you are calling is unable to take the call." Another option is to simply ignore the notification, such as might happen if the user had stepped away from the computer when the call came in. Ignoring the call, either explicitly (i.e., closing the dialog or using the Ignore Call button), or implicitly (i.e., not responding to the alert or not making a choice in the incoming call control dialog) causes the client to send a redirect message (see FIG. 6) just as in the case of forwarding a call. In contrast to call forwarding, the call is redirected to the default number that was included in the initial alert. If the user closes the dialog, nothing should be sent to the server. The default rule will execute based on a server timeout.

Figure 5:
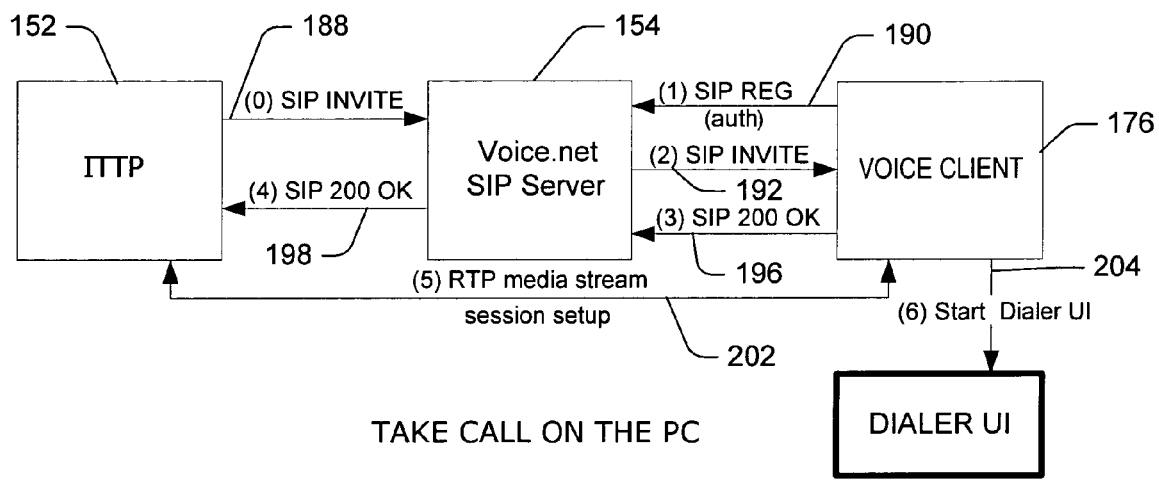
FIG. 5 is an exemplary flow diagram illustrating an operational sequence for taking a call via a messaging client of FIG. 1.

FIG. 5 shows an exemplary operational sequence for taking a call via the messaging client 176 (e.g., at the user's desktop PC). Beginning at 188, the call answering sequence begins upon choosing the option to take the call on the PC. At 190, messaging client 176 registers with the SIP proxy of voice service 164 to accept incoming traffic. The SIP proxy drops a REG CDR, marking the time when the registration took place and capturing the session ID and UID. In response to the registration, the SIP proxy recognizes at 192 that it has a pending call for this user and sends an INVITE to messaging client 176 to establish the call. The messaging client 176 on the PC accepts the invitation at 196 with a SIP response of 200

OK. At 198, voice service 154 forwards 200 OK back to ITSP 112 to accept the incoming call (INVITE at 188). A media stream between ITSP 152 and the voice client 176 on the user's PC begins at 202. Proceeding to 204, a "dialer" UI or other suitable UI element pops up to provide user control and status of the call in progress. If there is already a call in progress on the PC at the time the user opted to accept the incoming call, a message box appears warning that this will result in the disconnection of the call in progress with [OK] and [Cancel] options. If the user clicks [OK], a BYE message is sent to the SIP proxy and the call is torn down before accepting the incoming call.

Figure 6:
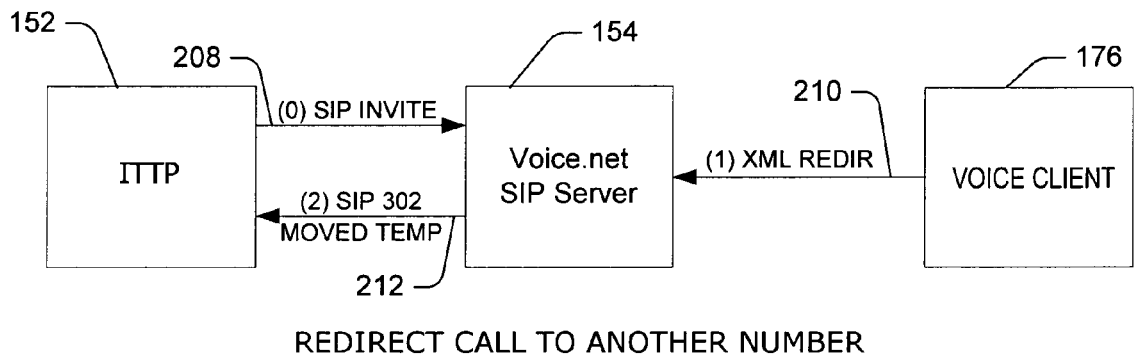
FIG. 6 is an exemplary flow diagram illustrating an operational sequence for redirecting a call to another number according to one embodiment of the invention.

Referring now to FIG. 6, the present invention also provides call control options via the incoming call control dialog for redirecting a call to another number. Again, operations begin with a SIP INVITE at 208. In this example, messaging client 176 sends an Extensible Markup Language (XML) message to the SIP proxy of voice service 154 at 210. The message indicates that the call should be redirected. The message further includes a URI containing the target number of the redirect. In the case of voicemail, for example, a special Voicemail URI provided in advance by ITSP 152 is used. Proceeding to 212, the SIP proxy constructs a SIP 302 response to the original incoming call INVITE at 208 and sends the response to ITSP 152.

Figure 7:
FIG. 7 illustrates an exemplary user interface for a call transfer dialog according to one embodiment of the invention.

FIG. 7 shows an exemplary call transfer dialog. According to the illustrated embodiment of the invention, a call transfer dialog pops up following an explicit transfer action to confirm that the transfer occurred and to offer the user some additional options in connection with the address book functionality. Depending on the circumstances, the call transfer dialog takes one of several forms. In each case, the dialog offers relevant follow-up actions pertaining to the address book. Each version of the dialog offers to record the call in the call history. If call information is not found in the address book but caller name information is provided, then the dialog shows the caller's name. Without caller name information, the dialog merely shows the number. Calling party information is provided but may not be recognized as matching an existing entry in the address book. The call transfer dialog offers to create an entry using the information that came with the call. On the other hand, the call transfer dialog displays previously stored call information found in the address book.

During setup, alert service 162 delivers voice UI such as described in TABLE III:

TABLE III

| Page | Description |
| --- | --- |
| Call Forwarding | Main page for call control settings. Define call forwarding rules and override settings. |
| Call Forwarding "Calendar" | Time category settings |

Figure 8:
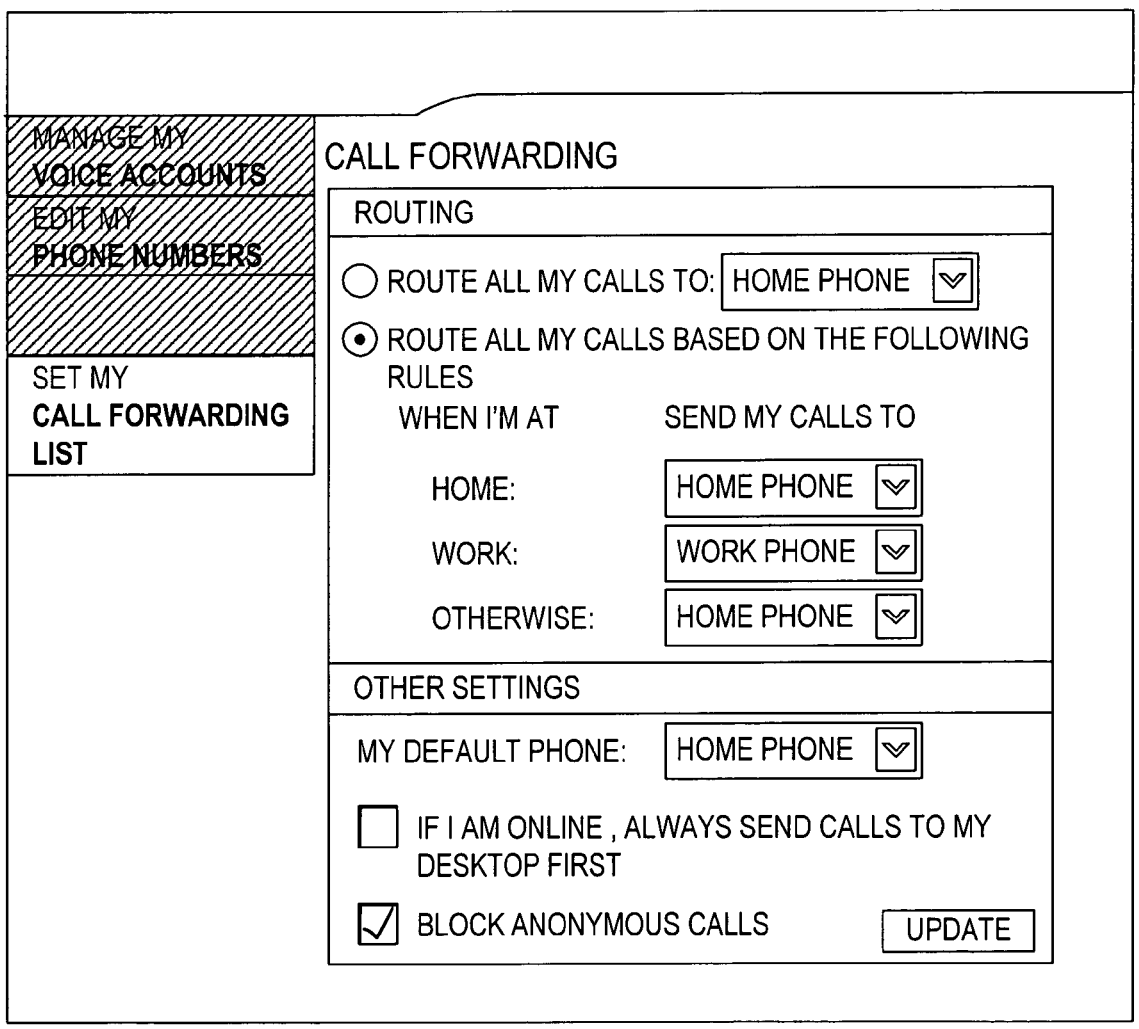
FIG. 8 illustrates an exemplary user interface for specifying call forwarding settings according to one embodiment of the invention.

FIG. 8 is an exemplary UI related to call forwarding. The call forwarding page of FIG. 8 is a primary page for inbound call settings owned by alert service 162. On this page, users can make the settings described in TABLE IV:

TABLE IV

| Setting | Description |
| --- | --- |
| Override Forwarding Action | User declares that all calls are forwarded to a given phone right now |
| Standard Forwarding Action | For a given context, designate the call forwarding action. The contexts are "Home", "Work", and "Default/Backup" |

TABLE IV-continued

| Setting | Description |
| --- | --- |
| Forward Calls To PC First | This is a true/false setting to direct incoming calls to the PC first when online |
| Block Anonymous Calls | This is a true/false setting to block calls with Caller ID bits set to "Anonymous" |

Referring further to FIG. 8, when the user signs up for voice services, he or she defines a default phone (Home, Work, Mobile, or Other) for receiving calls when the user is not online. Initially, the user has a single call forwarding action to route all calls to the default phone. After initial sign-up, the user visits the Call Forwarding page to change the default forwarding phone. In addition, the user can set up different phones to forward to for different times of day. The user can also override these settings temporarily.

In one embodiment, the different time categories are Work, Home, and Other. The Other category simply includes all times that are not Work and not Home. In addition, the default phone is referred to as the "Backup" phone. For the purposes of the functional UI, if Home or Work hour settings are missing, the rule will simply not take effect. The functional UI will not check for whether the setting is made.

The user can also choose to send inbound calls to messaging client 176 (e.g., at the user's desktop PC) first when he or she is online. This is before forwarding the call to the device specified in the forwarding actions. When the user opts to answer the incoming call at the desktop, voice service 154 first sends the call to messaging client 176 via messaging service 166, which causes the caller application to pop up on the user's desktop. If the user does not respond to the caller application, the call is forwarded to the appropriate device based on the default or time-based rule.

As described above, the user can decide not to take calls from callers who have caller ID set to Anonymous. This is useful when trying to block telemarketers, who often set caller ID to Anonymous. When the user chooses this setting, the voice service 164 backend will either just ring busy to the caller, or ideally inform the user how to disable anonymous caller ID so the call can get through.

Referring now to the exemplary UI of FIG. 9, the invention permits the user to enter call forwarding preferences based on time of day. A user who has created a partial Calendar (only defined home or work hours) and arrives on the call forwarding page finds that he or she can only forward calls for calendar times defined. If the user did not schedule work or home hours then the forwarding functionality will not be enabled for that location.

FIG. 10 is an exemplary user interface for the user to provide more detailed preferences for setting the call routing rules. This is where users go to set up custom rules that allot time frames assigned to categories of "work" and "home". In this example, the user can create up to six rules that correlate to a calendar. The UI prompts the user to create schedule rules that allow him or her to say "I am at <home> or <work> from <hour> until <hour> on these <days>". Dropdowns for location and time are made available and checkboxes for days of the week. In particular, FIG. 10 shows a Rules Summary UI including a full listing of rules and a corresponding calendar.

APPENDIX A describes the voice interface in detail.

Figure 11:
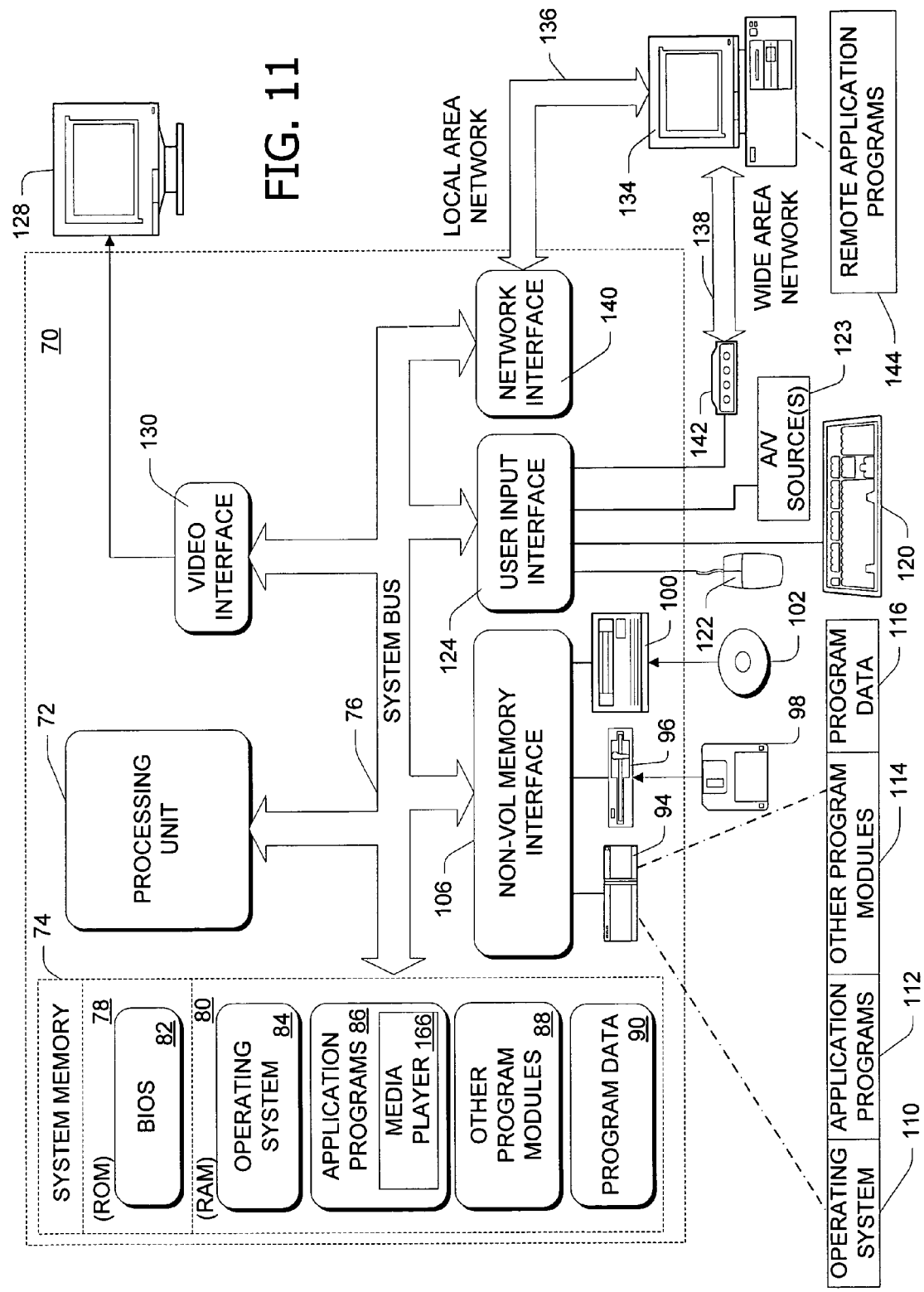
FIG. 11 is a block diagram illustrating exemplary components of a computer for use with the present invention.

FIG. 11 shows one example of a general purpose computing device in the form of a computer 70. In one embodiment of the invention, a computer such as the computer 70 is suitable for use in voice service 152, alert service 162, messaging service 166, and messaging client 176.

In the illustrated embodiments, computer 70 has one or more processors or processing units 72 and a system memory 74. In the illustrated embodiment, a system bus 76 couples various system components including the system memory 74 to the processors 72. The bus 76 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 70 typically has at least some form of computer-readable media. Computer-readable media, which include both volatile and nonvolatile media, removable and non-removable media, may be any available medium that can be accessed by computer 70. By way of example and not limitation, computer-readable media comprise computer storage media and communication media. Computer storage media include volatile and nonvolatile, removable and non-removable media implemented in any method or technology for storage of information such as computer-readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 70. Communication media typically embody computer-readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer-readable media.

The system memory 74 includes computer storage media in the form of removable and/or non-removable, volatile and/or nonvolatile memory. In the illustrated embodiment, system memory 74 includes read only memory (ROM) 78 and random access memory (RAM) 80. A basic input/output system 82 (BIOS), containing the basic routines that help to transfer information between elements within computer 70, such as during startup, is typically stored in ROM 78. The RAM 80 typically contains data and/or program modules that are immediately accessible to and/or presently being operated on by processing unit 72. By way of example, and not limitation, FIG. 11 illustrates operating system 84, application programs 86, other program modules 88, and program data 90.

The computer 70 may also include other removable/non-removable, volatile/nonvolatile computer storage media. For example, FIG. 11 illustrates a hard disk drive 94 that reads from or writes to non-removable, nonvolatile magnetic media. FIG. 11 also shows a magnetic disk drive 96 that reads from or writes to a removable, nonvolatile magnetic disk 98, and an optical disk drive 100 that reads from or writes to a removable, nonvolatile optical disk 102 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 94, and magnetic disk drive 96 and optical disk drive 100 are typically connected to the system bus 76 by a non-volatile memory interface, such as interface 106.

The drives or other mass storage devices and their associated computer storage media discussed above and illustrated in FIG. 11, provide storage of computer-readable instructions, data structures, program modules and other data for the computer 70. In FIG. 11, for example, hard disk drive 94 is illustrated as storing operating system 110, application programs 112, other program modules 114, and program data 116. Note that these components can either be the same as or different from operating system 84, application programs 86, other program modules 88, and program data 90. Operating system 110, application programs 112, other program modules 114, and program data 116 are given different numbers here to illustrate that, at a minimum, they are different copies.

A user may enter commands and information into computer 70 through input devices or user interface selection devices such as a keyboard 120 and a pointing device 122 (e.g., a mouse, trackball, pen, or touch pad). Other input devices (not shown) may include a microphone, joystick, game pad, satellite dish, scanner, or the like. These and other input devices are connected to processing unit 72 through a user input interface 124 that is coupled to system bus 76, but may be connected by other interface and bus structures, such as a parallel port, game port, or a universal serial bus (USB). A monitor 128 or other type of display device is also connected to system bus 76 via an interface, such as a video interface 130. In addition to the monitor 128, computers often include other peripheral output devices (not shown) such as a printer and speakers, which may be connected through an output peripheral interface (not shown).

The computer 70 may operate in a networked environment using logical connections to one or more remote computers, such as a remote computer 134. The remote computer 134 may be a personal computer, a server, a router, a network PC, a peer device or other common network node, and typically includes many or all of the elements described above relative to computer 70. The logical connections depicted in FIG. 11 include a local area network (LAN) 136 and a wide area network (WAN) 138, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 70 is connected to the LAN 136 through a network interface or adapter 140. When used in a wide area networking environment, computer 70 typically includes a modem 142 or other means for establishing communications over the WAN 138, such as the Internet. The modem 142, which may be internal or external, is connected to system bus 76 via the user input interface 124, or other appropriate mechanism. In a networked environment, program modules depicted relative to computer 70, or portions thereof, may be stored in a remote memory storage device (not shown). By way of example, and not limitation, FIG. 11 illustrates remote application programs 144 as residing on the memory device. It will be appreciated that the network connections shown are exemplary and other means of establishing a communications link between the computers may be used.

Generally, the data processors of computer 70 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described herein in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 70, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics including mobile phones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 70 executes computer-executable instructions such as those described herein to dynamically route telephone calls. A voice service initiates a voice call session on a data communication network in response to an incoming telephone call directed to a user and generates a notification of the telephone call. An alerts service receiving and responsive to the notification executes a set of routing rules to select a computing device associated with the user. The alerts service also generates an alert directed to the computing device. If the computing device is online, a messaging service sends the alert to the computing device and receives a user request from the computing device in response thereto. In this embodiment, the messaging service constitutes a routing service that communicates the user request to the voice service for completing the voice call session to the computing device if specified by the user request. If the computing device is not online, the telephone call is routed to a telephone device.

Information in this document, including uniform resource locator and other Internet Web site references, is subject to change without notice. Unless otherwise noted, the example companies, organizations, products, domain names, e-mail addresses, logos, people, places and events depicted herein are fictitious, and no association with any real company, organization, product, domain name, e-mail address, logo, person, place or event is intended or should be inferred.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

APPENDIX A

Voice Interface

Basic Protocol

The basic protocol for Voice—Alerts interaction is a single synchronous HTTP request/response that takes the following form:

Voice sends Alerts a notification with an INITIATE action. This indicates that a there is an incoming phone call for the Voice subscriber referenced by the single TO recipient of the notification. The notification includes caller ID information of the caller if any. It also includes a notification payload to send to the messaging client's Voice applet if the user is online.

Based on the Voice subscriber's preferences and current context (such as whether the subscriber is online, time of day), Alerts decides where the call should be routed. If the user is online and has elected to receive calls online, Alerts immediately sends the notification to the messaging service to forward to the messaging client. Alerts responds with the routing decisions. This includes at least one phone number and optionally the PC as the destination if the alert was forwarded to the messaging service.

This single synchronous request/response exchange completes the normal processing for one incoming call.

In case the original caller hangs up before the call is routed, Voice services may be notified of a hang-up action by the phone network through the ITSP. When that occurs, Voice may send a notification to cancel the incoming call.

Voice only needs to send a cancel notification to Alerts when the routing in the original call notification response included the PC. Alerts will simply relay the notification to the messaging service.

Defined Constants

Action verbs: There are two types of Voice call notifications. The ActionVerb is required for a Voice notification. If no ActionVerb is specified, it is an error.

Profile phone numbers: Voice users can define a set of predefined categories of phone numbers such as Home phone and Work phone. In addition, Alerts can return "PC" for the desktop and "Busy" when a call should be blocked.

Caller ID: Caller ID bit designations for incoming phone calls. Alerts currently treats "unavailable" as the same as "normal".

Inbound phone category: The inbound phone category designates which type of phone a user is receiving a call on, in cases where the user has signed up for multiple inbound Voice numbers for use as e.g., Personal, Business, Junk phone numbers.

Inbound Alert Packet Format

An inbound Voice call alert uses the Alerts packet format with a few extensions specific to Voice.

A Voice packet contains the ActionVerb attribute to the top-level Alerts NOTIFICATION element.

The value of the ActionVerb attribute is an integer action verb value. For example, the initiate action is 1.

Strictly speaking, ActionVerb is the only required part for a Voice packet. Note however that if a Voice packet is missing the INBOUND_CALL payload in the BODY, then it is not a well-formed Voice packet.

Response Packet Format

The response that Alerts sends to Voice is a standard HTTP response. In addition to an HTTP response code (documented in the next section), Alerts sends Voice the routing decision for the incoming call in the body of the response.

The response format is a pseudo XML markup language much like NML, the format that is used for posting notifications to Alerts.

Cancel Notifications Alerts treats a cancel notification exactly the same as an initiate notification. Therefore, the Alerts response to a cancel notification is also exactly the same as with an initiate notification. What this means is that when a user is online, Alerts will forward the cancel notification to the messaging service and respond appropriately, including a phone number routing in the packet. If the user is not online, then Alerts will not be able to cancel the call through the messaging service and will respond only with a phone number routing.

Response Codes

When a Voice call notification succeeds, Alerts responds with a HTTP 200 OK status code with a RESPONSE document as defined in the previous section. Note that a standard Alerts response returns a HTTP 202 "Accepted" response. This applies for both initiate and cancel notifications.

When a Voice call notification fails, the HTTP response includes a standard HTTP response code (such as 401 for auth failure) and a response body including a status code.

The failure responses for a Voice notification are the same as for any other type of Alert. This applies for both initiate and cancel notifications. When Voice encounters any failures, it should use the cached default routing for the user. Voice should log the failure code for informational/debugging purposes.

What is claimed is:

1. A method of routing a telephone call dynamically to a user comprising:
  initiating a voice call session on a data communication network in response to an incoming telephone call directed to the user, said data communication network having one or more computing devices coupled thereto;
  dynamically determining whether the user is online via the selected computing device associated with the user and coupled to the data communication network, said dynamically determining comprising dynamically determining whether the user is online based on a user context corresponding to a log-in sub-state presence of the user and indicating that the user is currently online via selected computing devices connected to the data communications network or whether the user is online based on a binary presence indicating that the selected computing device is connected to the data communications network while the user is not logged in, said log-in sub-state presence comprising: an online state, a busy state, an away state, and an offline state;
  in response to the determination of log in sub-state presence, executing a set of routing rules for routing the incoming telephone call associated with the user, the execution of the routing rules including:
    in response to a determination that the log in sub-state corresponds to an online state:
      selecting a computing device associated with the online state,
      generating an alert message by an alert service, the alert service configured to receive Hypertext Transfer Protocol (HTTP) requests from a Session Initiation Protocol (SIP) server,
      routing an alert message by a messaging service, the messaging service configured to receive requests from the alerts service,
      displaying the alert at the selected computing device, wherein the alert displays an indication of a timeout and information about the caller based on data within an address book;
    in response to a determination that the log-in sub-state does not correspond to an online state:
      determining a schedule associated with the user,
      determining a location associated with the schedule and a current time and a day of week, and
      selecting a computing device based on the location of the user; and
      completing the voice call session to the selected computing device.

2. The method of claim 1 further comprising, if the selected computing device is not online, routing the telephone call to a selected telephone device associated with the user and coupled to a telephone network.

3. The method of claim 2 further comprising, if the selected computing device is online, routing the telephone call to the selected telephone device in response to a user request for receiving the telephone call via the telephone network instead of the data communication network.

4. The method of claim 2 wherein the selected telephone device is selected according to the routing rules.

5. The method of claim 2 wherein the routing rules include rules for selecting one of a plurality of telephone devices coupled to the telephone network based on one or more of the following: time of day, day of week, schedule, and caller identity.

6. The method of claim 1 wherein the routing rules include rules for selecting one of a plurality of computing devices coupled to the data communication network based on one or more of the following: time of day, day of week, schedule, and caller identity.

7. The method of claim 1 wherein the telephone call originates from the telephone network.

8. The method of claim 1 further comprising parking the voice call session in a waiting state pending the user request.

9. The method of claim 8 further comprising either terminating or completing the parked voice call session based on the user request.

10. The method of claim 8 further comprising notifying the selected computing device of the telephone call via the data communication network if the selected computing device is online.

11. The method of claim 1 wherein the selected computing device comprises a messaging client configured for receiving the alert from a messaging server to notify the user of the telephone call, said messaging client and said messaging server being coupled to the data communication network.

12. The method of claim 11 further comprising receiving a user request from the messaging client and routing the telephone call in response thereto, said user request being representative of a user preference for one of the following: receiving the telephone call via the data communication network at the selected computing device; receiving the telephone call via the data communication network at a computing device other than the selected computing device; receiving the telephone call via the telephone network at a selected telephone device; receiving the telephone call via the telephone network at a telephone device other than the selected telephone device; and blocking the telephone call.

13. The method of claim 11 further comprising canceling the alert if the telephone call is terminated while the voice call session is parked.

14. One or more computer-readable media having computer-executable instructions for performing the method of claim 1.

15. A system for routing a telephone call dynamically to a user comprising:
a voice service initiating a voice call session on a data communication network in response to an incoming telephone call directed to the user, said telephone call originating from a public switched telephone network external to the data communication network, said voice service further generating a notification of the telephone call, wherein the voice service is implemented on a Session Initiation Protocol (SIP) server;
an alerts service receiving and responsive to the notification generated by the voice service for executing a set of routing rules to dynamically select a computing device associated with the user based on user preferences, said user preferences defining an online presence indicating a user context according to a log-in sub-state presence and indicating that the user is currently online or indicating a binary presence based on the computing device being connected to the communication network and for generating an alert directed to the selected computing device, wherein the log-in sub-state comprises an online state, a busy state, an away state and an offline state, said computing device being coupled to the data communication network, wherein the alerts service responds to a Hypertext Transfer Protocol (HTTP) request from the voice service by generating an alert indicating a time to respond and the alert includes address book data associated with a caller; and
a messaging service for sending the alert to the selected computing device when the selected computing device is online based on the log-in sub-state in accordance with the user preferences and not based on the binary presence and for receiving a user request from the selected computing device in response thereto, said messaging service communicating the user request to the voice service for completing the voice call session to the selected computing device if the user request specifies receiving the telephone call via the data communication network and at the computing device.

16. The system of claim 15 wherein the voice server returns the telephone call to the telephone network for routing to a selected telephone device if the user request specifies receiving the telephone call via the telephone network instead of the data communication network.

17. The system of claim 16 wherein the voice server returns the telephone call to the telephone network for routing to a selected telephone device if the messaging service does not receive a user request within a predetermined interval.

18. The system of claim 16 wherein the selected telephone device is selected according to the routing rules.

19. The system of claim 18 wherein the routing rules include rules for selecting one of a plurality of telephone devices based on one or more of the following: time of day, day of week, schedule, and caller identity.

20. The system of claim 15 wherein the routing rules include rules for selecting one of a plurality of computing devices coupled to the data communication network based on one or more of the following: time of day, day of week, schedule, and caller identity.

21. The system of claim 15 wherein the voice service comprises a session initiation protocol (SIP) server responsive to a SIP request from an interne telephony service provider for initiating the voice call session, said SIP request representing the incoming telephone call.

22. The system of claim 21 wherein the voice call session is parked in a waiting state at the SIP server pending the user request.

23. The system of claim 22 wherein the SIP server is responsive to the user request for either terminating or completing the parked voice call session.

24. The system of claim 22 wherein the SIP server is responsive to the telephone call being terminated while the voice call session is parked for canceling the alert.

25. The system of claim 15 wherein the notification generated by the voice service comprises a Hypertext Transfer Protocol (HTTP) request representative of the telephone call.

26. The system of claim 15 wherein the selected computing device comprises a messaging client coupled to the data communication network and configured for receiving the alert to notify the user of the telephone call.

27. The system of claim 15 wherein the user request is representative of a user preference for one of the following: receiving the telephone call via the data communication network at the selected computing device; receiving the telephone call via the data communication network at a computing device other than the selected computing device; receiving the telephone call via the telephone network at a selected telephone device; receiving the telephone call via the telephone network at a telephone device other than the selected telephone device; and blocking the telephone call.

28. A method of routing a telephone call dynamically to a user comprising:
initiating a voice call session on a data communication network in response to an incoming telephone call directed to the user, said data communication network having one or more computing devices coupled thereto, wherein the voice call session is initiated on a Session Initiation Protocol (SIP) server;
receiving a request to generate a notification via Hypertext Transfer Protocol (HTTP) from the SIP server, and generating the notification of the telephone call;
dynamically determining whether a selected computing device associated with the user is available to receive the notification based on the user's availability, said user's availability depending on a user context corresponding to a log-in sub-state presence of the user and indicating that the user is currently online at the selected computing device while connecting to the data communications network or depending on a binary presence indicating that the selected computing device is connected to the data communication network; wherein the log-in sub-state presence comprises an online state, a busy state, an away state and an offline state;

sending the notification to the selected computing device associated with the user and coupled to the data communication network when the user's availability is based on the log-in sub-state presence and not based on the binary presence, said notification being sent via the data communication network, wherein the notification includes a timeout and data associated with a caller identity, the data read from an address book;

receiving a user request via the data communication network for routing the telephone call in response to the notification; and responsive to the user request, either completing the voice call session to the selected computing device via the data communication network or routing the telephone call to a selected telephone device via a telephone network.

29. The method of claim 28 further comprising executing a set of routing rules for routing the telephone call absent the user request, said routing rules being based on user preferences.

30. The method of claim 29 wherein the selected telephone device is selected according to the routing rules.

31. The method of claim 29 wherein the routing rules include rules for selecting one of a plurality of telephone devices coupled to the telephone network based on one or more of the following: time of day, day of week, schedule, and caller identity.

32. The method of claim 28 wherein the telephone call originates from the telephone network.

33. The method of claim 28 further comprising parking the voice call session in a waiting state pending the user request.

34. The method of claim 33 further comprising either terminating or completing the parked voice call session based on the user request.

35. The method of claim 28 wherein the selected computing device comprises a messaging client configured for receiving an alert from a messaging server to notify the user of the telephone call, said messaging client and said messaging server being coupled to the data communication network.

36. The method of claim 35 further comprising receiving a user request from the messaging client and routing the telephone call in response thereto, said user request being representative of a user preference for one of the following: receiving the telephone call via the data communication network at the selected computing device; receiving the telephone call via the data communication network at a computing device other than the selected computing device; receiving the telephone call via the telephone network at the selected telephone device; receiving the telephone call via the telephone network at a telephone device other than the selected telephone device; and blocking the telephone call.

37. The method of claim 35 further comprising canceling the alert if the telephone call is terminated while the voice call session is parked.

38. One or more computer-readable media having computer-executable instructions for performing the method of claim 28.

39. One or more computer-readable media having computer-executable components for routing a telephone call dynamically to a user, said computer-readable media comprising:

a voice component for initiating a voice call session on a data communication network in response to an incoming telephone call directed to the user and generating session information related to the telephone call, said data communication network having one or more computing devices coupled thereto, wherein the voice component is executed by a Session Initiation Protocol (SIP) server;

an alert component receiving the session information via Hypertext Transfer Protocol (HTTP) and responsive to the session information, sending a notification to a selected computing device associated with the user and coupled to the data communication network based on a user context corresponding to a log-in sub-state presence of the user indicating that the user is currently online at the selected computing device or based on a binary presence indicating that the selected computing device is connected to the data communication network, wherein the log-in sub-state presence comprises an online state, a busy state, an away state and an offline state, said alert component sending the notification to the selected computing device via the data communication network when the selected computing device is online based on the log-in sub-state presence and not based on the binary presence, wherein the notification includes a timeout and address book data associated with the caller number; and a routing component for receiving a user request via the data communication network and routing the telephone call in response to the user request, said routing component either completing the voice call session to the selected computing device via the data communication network or routing the telephone call to a selected telephone device via a telephone network.

40. The computer-readable media of claim 39 further comprising a set of routing rules for routing the telephone call absent the user request, said routing rules being based on user preferences.

41. The computer-readable media of claim 40 wherein the selected computing device is selected according to the routing rules.

42. The computer-readable media of claim 41 wherein the routing rules include rules for selecting one of a plurality of computing devices coupled to the data communication network based on one or more of the following: time of day, day of week, schedule, and caller identity.

43. The computer-readable media of claim 40 wherein the selected telephone device is selected according to the routing rules.

44. The computer-readable media of claim 43 wherein the routing rules include rules for selecting one of a plurality of telephone devices coupled to the telephone network based on one or more of the following: time of day, day of week, schedule, and caller identity.

45. The computer-readable media of claim 39 wherein the voice component is responsive to a session initiation protocol request from an internet telephony service provider for initiating the voice call session.

* * * * *